US007681066B2

(12) United States Patent
Apparao et al.

(10) Patent No.: US 7,681,066 B2
(45) Date of Patent: *Mar. 16, 2010

(54) QUANTIFYING CORE RELIABILITY IN A MULTI-CORE SYSTEM

(75) Inventors: Padmashree K. Apparao, Portland, OR (US); Robert F. Kwasnick, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/479,569

(22) Filed: Jun. 30, 2006

(65) Prior Publication Data

US 2008/0005537 A1 Jan. 3, 2008

(51) Int. Cl.
*G06F 1/04* (2006.01)

(52) U.S. Cl. ........................... 713/600; 712/220; 714/1

(58) Field of Classification Search ................ 713/501, 713/600; 712/220; 714/1
See application file for complete search history.

(56) References Cited

U.S. PATENT DOCUMENTS

| | | | | |
|---|---|---|---|---|
| 6,933,739 | B1 * | 8/2005 | Rosen | 324/763 |
| 7,180,380 | B2 * | 2/2007 | Bienek et al. | 331/66 |
| 7,205,854 | B2 * | 4/2007 | Liu | 331/57 |
| 2005/0040397 | A1 * | 2/2005 | Hui et al. | 257/48 |
| 2005/0050373 | A1 * | 3/2005 | Orenstien et al. | 713/320 |
| 2007/0168759 | A1 * | 7/2007 | Goodnow et al. | 714/47 |
| 2007/0300086 | A1 * | 12/2007 | Kwasnick et al. | 713/300 |

* cited by examiner

*Primary Examiner*—Chun Cao
(74) *Attorney, Agent, or Firm*—Buckley, Maschoff & Talwalkar LLC

(57) ABSTRACT

A system may comprise a first processor core, a second processor core and a processor core assignor. The first processor core may include a first circuit to generate a first data and a second processor core may include a second circuit to generate a second data. The processor core assignor may assign a first thread to the first processor core or to the second processor core based on the first data, the second data, and an application reliability requirement.

14 Claims, 6 Drawing Sheets

200

Receive a first data associated with a first processor core
201

↓

Receiving a second data associated with a second processor core
202

↓

Assign an application to the first processor core or to the second processor core based on an application reliability requirement, the first data and the second data
203

FIG. 5

| CORE NUMBER | Initial Processor Core Speed (GHz) | Initial Frequency (GHz) |
|---|---|---|
| 1 | 3.18 | 3.18 |
| 2 | 3.09 | 3.09 |
| 3 | 3.30 | 3.30 |
| 4 | 3.18 | 3.18 |

| CORE NUMBER | Processor Core Speed (GHz) | Reliability Level |
|---|---|---|
| 1 | 3.17 | Ultra-reliable |
| 2 | 3.0 | Unreliable |
| 3 | 3.29 | Ultra-reliable |
| 4 | 3.09 | Reliable |

FIG. 6

QUANTIFYING CORE RELIABILITY IN A MULTI-CORE SYSTEM

BACKGROUND

A multi-core platform includes two or more processor cores. Over time, as the platform is used, each processor core may age or wear differently resulting in differences in reliability among the processor cores of the platform. A critical application such as a healthcare-related application may therefore be executed by a processor core that is unsatisfactorily unreliable. Conversely, a non-critical application may be executed by processor core that exhibits a high level of reliability. Either of the foregoing scenarios presents an inefficient use of processor core resources.

BRIEF DESCRIPTION OF THE DRAWINGS

FIG. 5 is a tabular representation of a portion of a database according to some embodiments.

FIG. 6 is a tabular representation of a portion of a database according to some embodiments.

DETAILED DESCRIPTION

Figure 1:
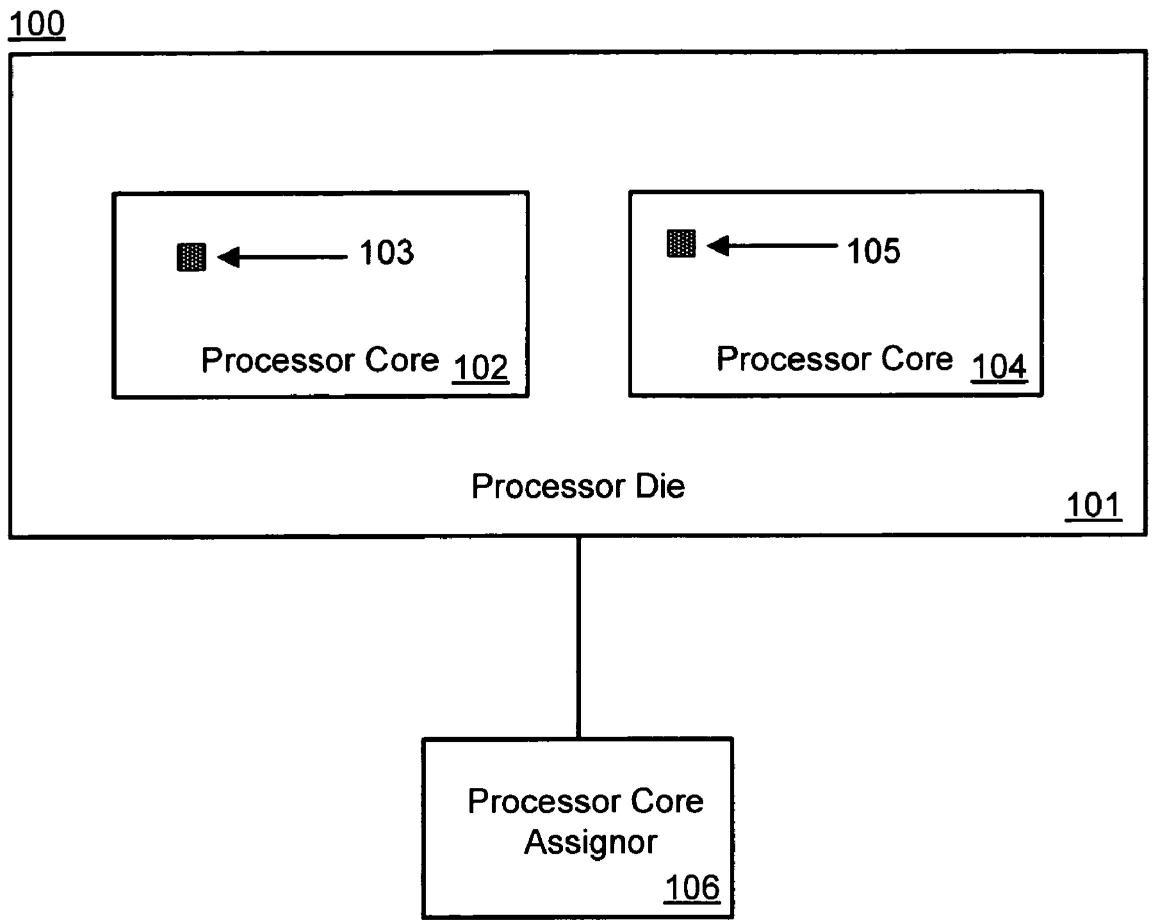
FIG. 1 illustrates a system according to some embodiments.

Referring to FIG. 1, an embodiment of a system 100 is shown. The system 100 may comprise a processor die 101 and a processor core assignor 106. The processor die 101 includes a first processor core 102 and a second processor core 104. The system 100 may comprise any electronic system, including, but not limited to, a desktop computer, a server, and a laptop computer. Moreover, the processor die 101 may comprise any integrated circuit die that is or becomes known.

For purposes of the present description, each of the processor cores 102 and 104 comprise systems for executing program code. The program code may comprise one or more threads of one or more software applications. Each of the processor cores 102 and 104 may include or otherwise be associated with dedicated registers, stacks, queues, etc. that are used to execute program code and/or one or more of these elements may be shared there between.

As illustrated in FIG. 1, the first processor core 102 may comprise a first circuit 103 to generate a first data and the second processor core 104 may comprise a second circuit 105 to generate a second data. The first circuit 103 and the second circuit 104 may comprise elements whose performance (e.g. operational frequency) degrades with use (e.g. with the application of voltage and temperature stress). Accordingly, the first data and the second data may indicate this degradation and may thereby indicate a reliability of the associated processor core.

In some embodiments, the first circuit 103 may comprise, but is not limited to, a ring oscillator and the second circuit 105 may comprise, but is not limited to, a ring oscillator. In some embodiments, the first processor core 102 may comprise two or more ring oscillators and the second processor core 104 may comprise two or more ring oscillators. The generated data may comprise an oscillation frequency associated with a respective ring oscillator according to some embodiments. The nature and usage of such data will be described in detail below.

The processor core assignor 106 may be implemented in hardware, firmware, or software. In some embodiments, the processor core assignor 106 may request the data from the first circuit 103 and the second circuit 105 and may receive the data in return. The processor core assignor 106 may assign an application to the first processor core 102 or to the second processor core 104 based on the first data and the second data. The foregoing structure may provide improved application reliability.

Figure 2:
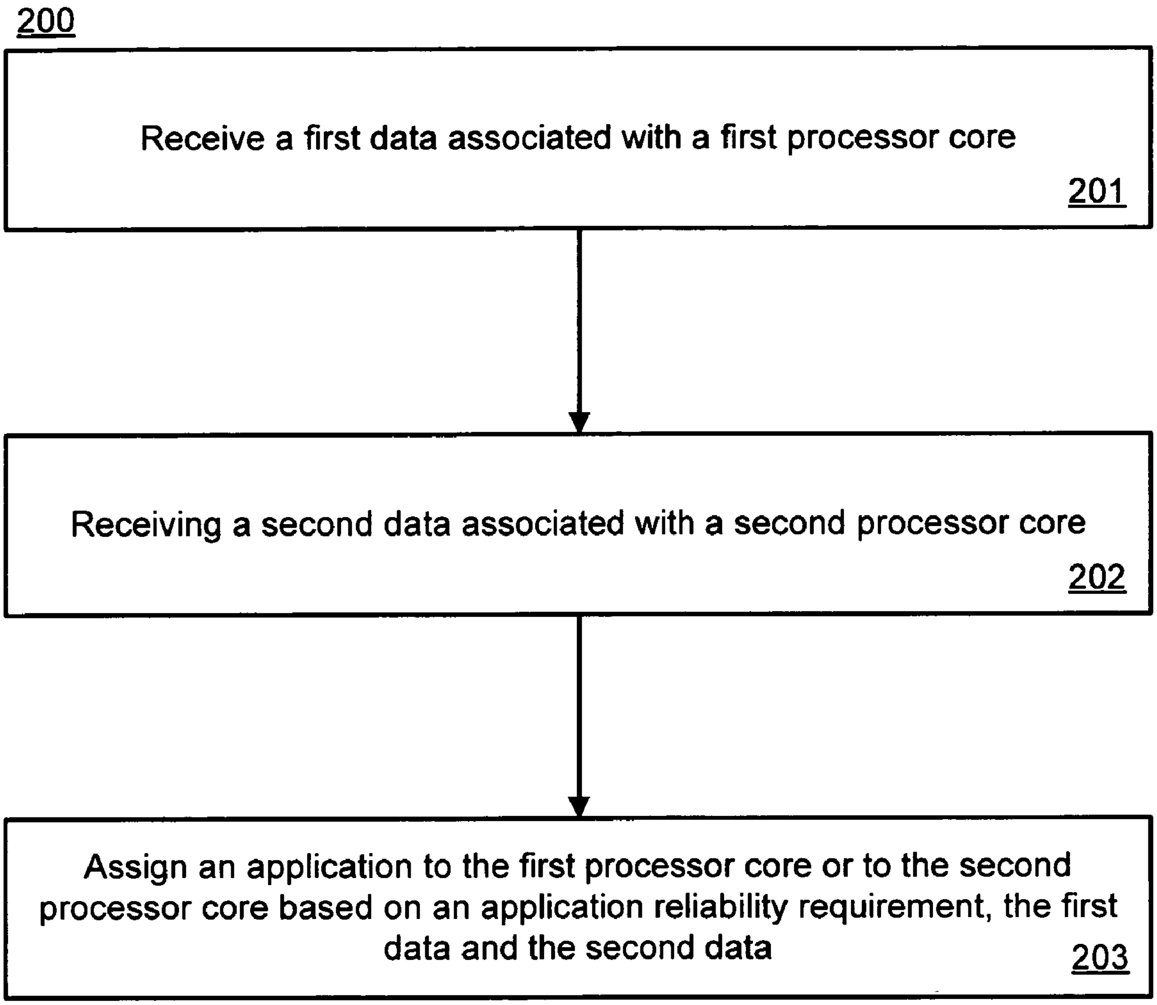
FIG. 2 comprises a flow diagram of a process according to some embodiments.

Now referring to FIG. 2, an embodiment of a process 200 is shown. The process 200 may be executed by any combination of hardware, software, and firmware, including but not limited to, the system 100 of FIG. 1. Some embodiments of the process 200 may improve reliability of application executions.

Initially, at 201, a first data associated with a first processor core may be received. The first data may indicate reliability of the first processor core. According to some embodiments, the first data comprises an oscillation frequency of a ring oscillator disposed in the first processor core.

Next, at 202, a second data associated with a second processor core may be received. The second data may also indicate reliability of the second processor core. In some embodiments, the second data may be received from a second circuit and the second data may comprise an oscillation frequency of the second circuit. As described above, the first processor core and the second processor core may be disposed on a single processor die. In some embodiments, the first processor core and the second processor core are disposed on different processor dies.

Next, at 203, an application may be assigned to the first processor core or to the second processor core based on the first data, the second data and an application reliability requirement. In this regard, an application may be associated with an application reliability requirement. The application reliability requirement may comprise an indication of processor core reliability that is required to execute the application.

According to some embodiments of 203, the processor core assignor 106 assigns the application based on a reliability of the first processor core 102 and the second processor core 104. In this regard, the first data and the second data may indicate that a reliability of the first processor core 102 and the second processor core 104, respectively.

In some embodiments of 203, application reliability requirements may be categorized into levels such as ultra-reliable, reliable and unreliable. According to some embodiments, the first data and the second data are used to determine a processor core speed of the first processor core and of the second processor core. The processor core speeds are then used to determine a reliability level (e.g., ultra-reliable, reliable and unreliable) for the first processor core and the second processor core. Next, the application is assigned to the first processor core or to the second processor core based on the application reliability requirement associated with the application and the reliability levels determined for the first processor core and the second processor core.

Figure 3:
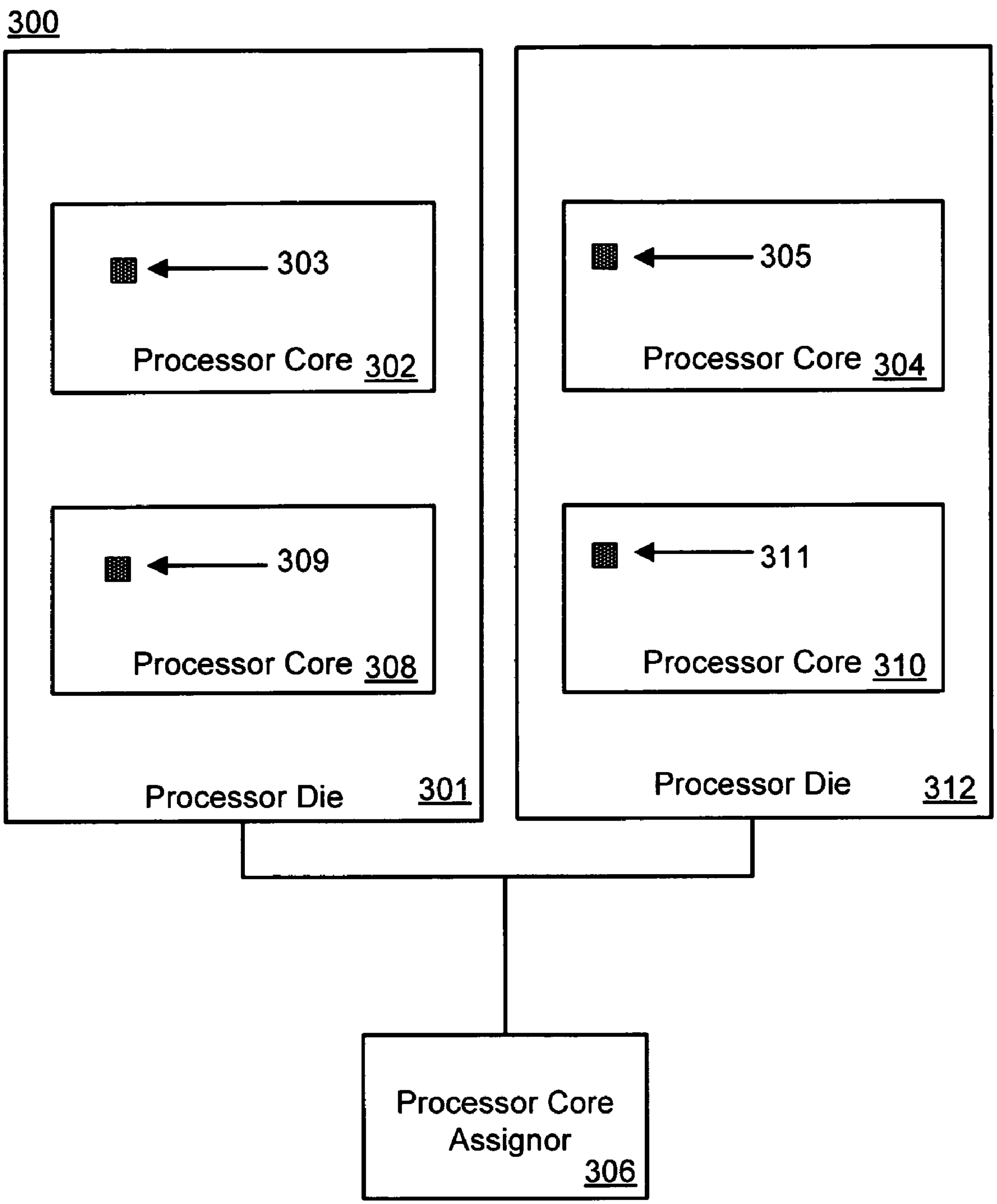
FIG. 3 illustrates a system according to some embodiments.

At FIG. 3, an embodiment of a system 300 is shown. The system 300 may implement process 200 according to some embodiments. The system 300 may comprise a first processor die 301, a second processor die 312, and a processor core assignor 306. The first processor die 301 may include one or more processor cores. As illustrated in FIG. 3, the first processor die 301 includes a first processor core 302 and a second processor core 308, and the second processor die 312 is associated with a third processor core 304 and a fourth processor core 310. The system 300, the illustrated processor die, and the processor cores may comprise any of the implementations described above with respect to identically-named elements of FIG. 1.

Each processor core 302, 304, 308, 310 may comprise a circuit 303, 305, 309, 311, respectively, to generate data. The data may indicate reliability of the associated processor cores. Each of circuits 303, 305, 309, 311 may comprise a ring oscillator circuit, with the generated data comprising an oscillation frequency of the ring oscillator circuit. In some embodiments, the first circuit 303, the second circuit 309, the third circuit 305, and the fourth circuit 311 may each comprise two or more ring oscillator circuits.

The processor core assignor 306 may be implemented in software, firmware, or hardware. In some embodiments, the processor core assignor 306 may request the above-mentioned data from each of circuits 303, 305, 309, 311 and may receive the data in return. The processor core assignor 306 may assign an application to processor cores 302, 304, 308, 310 based on each core's respective data and on an application reliability requirement. In some embodiments, the processor core assignor 306 may assign a first application to a processor core 302, 308 associated with the first processor die 301 and may assign a second application to a processor core 304, 310 associated with the second processor die 312 based on the data.

Figure 4:
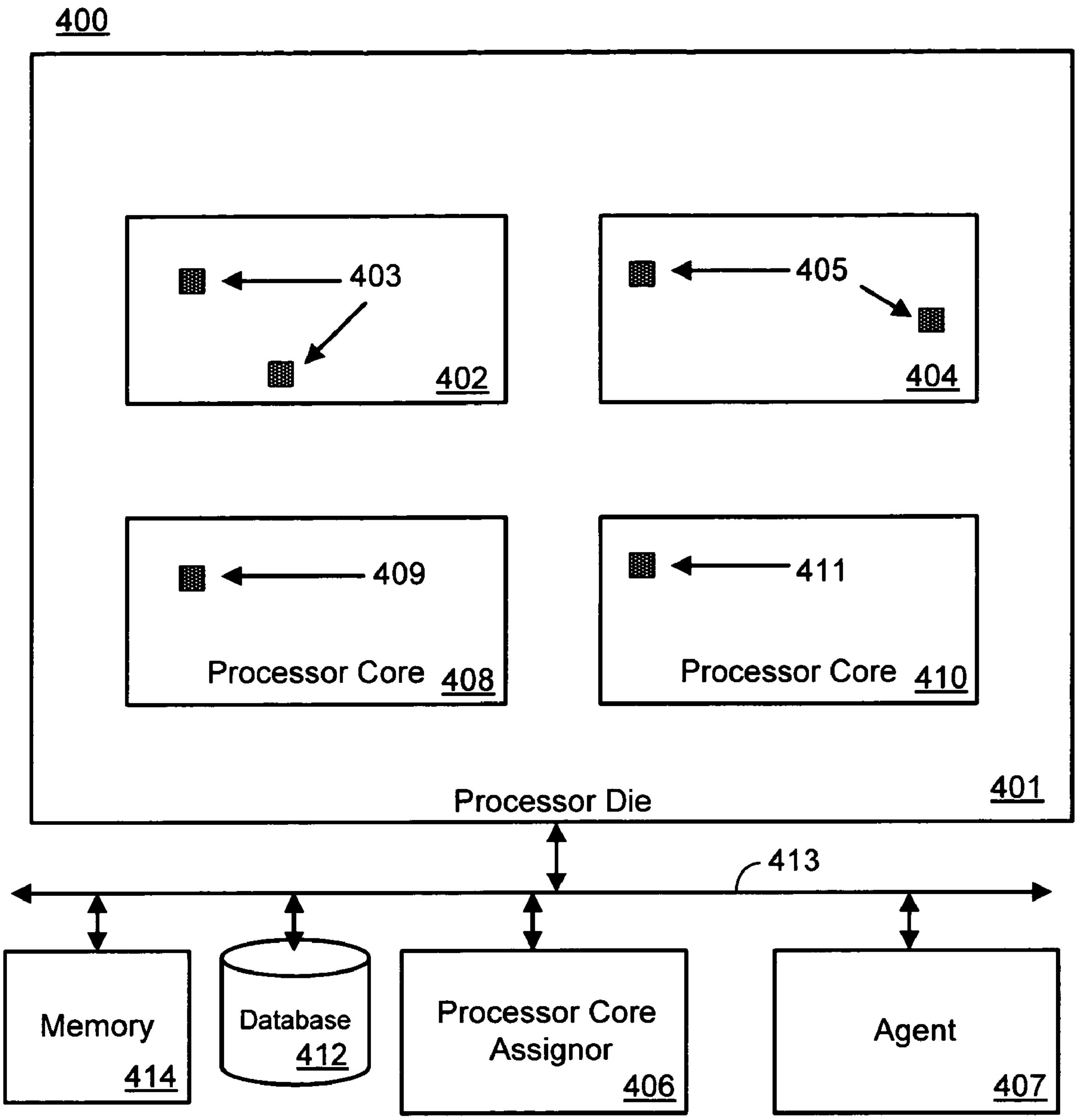
FIG. 4 illustrates a system according to some embodiments.

FIG. 4 demonstrates system 400 according to some embodiments. The system 400 may also execute process 200 of FIG. 2. The system 400 may comprise a processor die 401, a memory 414, a database 412, a bus 413, an agent 407, and a processor core assignor 406. The processor die 401 may include one or more processor cores. As illustrated in FIG. 4, the processor die 401 includes a first processor core 402, a second processor core 408, a third processor core 404, and a fourth processor core 410. In some embodiments, the system 400 implements a multi-core server platform.

Each processor core 402, 404, 408, 410 may comprise one or more circuits 403, 405, 409, 411 respectively to generate data. The data may be generated periodically or in response to a request from the agent 407 or the processor core assignor 406, and may be stored in the database 412. As illustrated in FIG. 4, the first processor core 402 may comprise two first circuits 403, the second processor core 408 may comprise a second circuit 409, the third processor core 404 may comprise two third circuits 405, and the fourth processor core 410 may comprise a fourth circuit 411. In some embodiments, the first circuits 403, the second circuit 409, the third circuits 405, and the fourth circuit 411 may each comprise, but are not limited to, one or more ring oscillator circuits. Accordingly, the generated data may relate to an oscillation frequency of a ring oscillator circuit. In some embodiments, one or more ring oscillator circuits may be located within a processor core 403, 404, 409, 411 based on die area, power, and accessibility.

The agent 407 may receive data from each circuit 403, 409, 405, 411. In some embodiments, the agent may assess the speed degradation of each processor core 402, 408, 404, 410 based on the received data. The agent 407 may be implemented in hardware, firmware, or software. Information generated by the agent 407 may be stored in database 412 in association with a respective processor core. In some embodiments, the agent may continuously poll each circuit 403, 409, 405, 411 for the above-described data at predetermined intervals.

The processor core assignor 406 may assign an application to processor cores 402, 404, 408, 410 based on each core's respective data. The processor core assignor 406 may be implemented in firmware, hardware, or software. In some embodiments, the processor core assignor 406 may request the data from each of circuits 403, 405, 409, 411 via the agent 407 and may receive the data in return. In some embodiments, the processor core assignor 406 uses data from both of the circuits 403 to assign an application to one of the processor cores 402, 404, 408, 410. The processor core scheduler 406 may determine an average of such data in order to facilitate comparison of the processor core 402 with the processor cores 404, 408, 410.

The memory 410 may store, for example, applications, programs procedures, and/or modules that store instructions to be executed. The memory 410 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The database 412 may store data used by the processor core scheduler 406 to assign threads to processor cores 402, 404, 408, 410. In some embodiments, the agent 407 stores the data in the database 412. The database 412, may be comprised of, but not limited to, non-volatile memory, flash memory, magnetic media, optical media, read only memory, or any other available media.

FIG. 5 illustrates a tabular representation of a portion of a database. In some embodiments, the tabular representation associates each of the processor cores 402, 404, 408, 410 with an initial processor core speed and an initial frequency of a respective circuit 403, 405, 409, 411. The initial processor core speed may be determined during a pre-shipment test of the system 400. The initial frequency may reflect an oscillation frequency of a respective circuit 403, 405, 409, 411. According to some embodiments, the initial processor core speed and the initial frequency are used to determine a function that relates the frequency and the processor core speed over time. The initial processor core speed, the initial frequency, and/or the function may be stored in a read only memory or a non-volatile memory of the system 400.

FIG. 6 is a tabular representation of a portion of a database. FIG. 6 associates each of several processor cores with a processor core speed and an associated reliability level. In some embodiments, a processor core's reliability level may be determined from its processor core speed. According to some embodiments, the processor core speed of each of the processor cores 402, 404, 408, 410 is determined based on an oscillation frequency of a respective circuit 403, 405, 409, 411, the above-mentioned function, and an amount of time elapsed between acquisition of the FIG. 5 data and the determination of the processor core speed.

As described above, a processor core may be associated with an ultra-reliable, reliable or unreliable reliability level. For example, an "ultra-reliable" reliability level may indicate that a speed of an associated processor core is five percent greater than a processor core threshold speed, and a "reliable" reliability level application reliability requirement may indicate that a speed of an associated processor core is between three and five percent greater than the processor core speed threshold.

In some embodiments, a processor core may be associated with an "unreliable" reliability level if its processor core speed is 3.0 GHz or below, and may be associated with an "ultra-reliable" reliability level if its processor core speed is 3.15 GHz or greater. The data of FIG. 5 and FIG. 6 may be represented by any alphanumeric character, symbol, or combination thereof and may be expressed in any suitable units.

Figure 7:
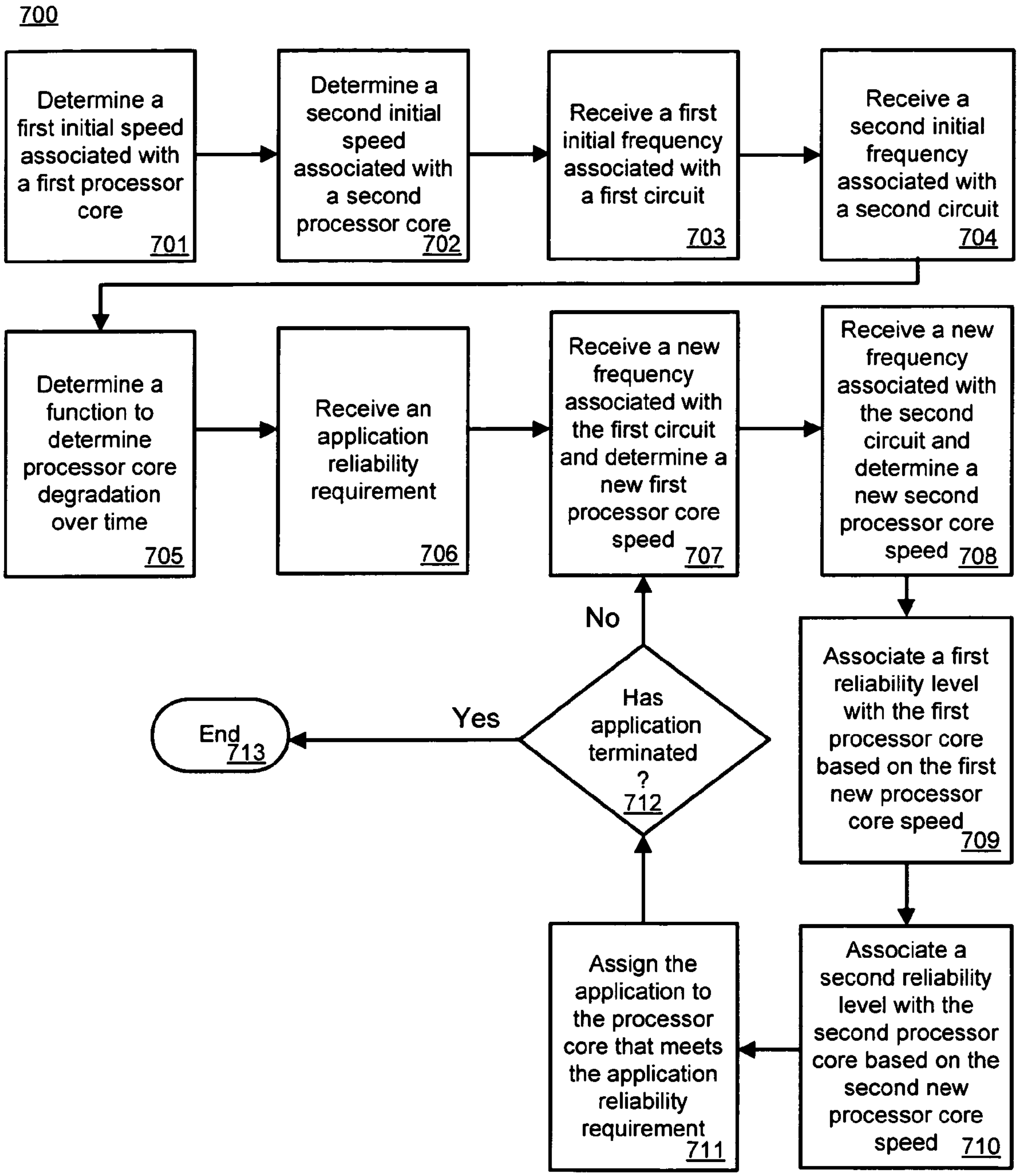
FIG. 7 comprises a flow diagram of a process according to some embodiments.

At FIG. 7, an embodiment of a process 700 is shown. The process 700 may be executed by any combination of hardware, software, and firmware, including but not limited to the systems 100, 300 and 400. Some embodiments of the process 700 may improve reliability of application executions.

Initially, at 701, a first initial processor core speed may be determined. The first initial processor core speed is associated with a first processor core. As described with respect to FIG. 4, the first initial processor core speed may be determined during pre-shipment testing and may be stored in association with the processor core as shown in FIG. 5.

Next, at 702, a second initial processor core speed associated with a second processor core may be determined. In some embodiments, the second processor core may be located on a same processor die and/or on a same computing platform as the first processor core, and the second initial processor core speed may also be determined during pre-shipment testing.

At 703, a first initial frequency associated with a first circuit may be received and, at 704, a second initial frequency associated with a second circuit may be received. The first circuit may be associated with the first processor core and the second circuit may be associated with the second processor core. As described with respect to FIG. 4, the initial frequencies may comprise oscillation frequencies of ring oscillator circuits.

Next, at 705, a function to determine processor core degradation over time is determined. In some embodiments, the function may comprise a transfer function that relates a percentage of circuit frequency degradation to a percentage of processor core speed degradation. In some embodiments, the function allows a determination of current processor core speed based on the data of FIG. 5 and a current oscillation frequency of a circuit (e.g., circuits 403, 405, 409, 411) associated with the processor core.

In some embodiments, a bias applied to the first circuit and to the second circuit is substantially equal to a bias applied to their respective processor cores. The aforementioned transfer function may consider temperature as a factor in degradation. In some embodiments, temperature correlation may be improved by placing the first circuit or the second circuit in locations of their respective processor cores that may exhibit higher temperatures or in an area that may be otherwise speed limited.

An application reliability requirement is received at 706. The application reliability requirement may comprise an indication of processor core reliability that is required to execute an application. The application reliability requirement may be received from the application itself, from an operating system of the system 400, and/or via any other suitable mechanism. The reliability requirement may be received at 706 by the processor core activation assignor 406 or by the agent 407.

At 707, a new frequency associated with the first circuit is received and a new first processor core speed is determined therefrom. In some embodiments, the new frequency may be a current oscillation frequency of with the first circuit. As described with respect to FIG. 4, the agent 407 may, in some embodiments of 707, receive an oscillation frequency from one of circuits 403, 405, 409, 411. The agent 407 may use the above-described function to determine the new first processor core speed based on the new frequency. The new first processor core speed may be stored in the database 412 as shown in FIG. 6.

A new frequency associated with the second circuit may be received and a new second processor core speed may be determined therefrom at 708. The determination at 708 may proceed as described with respect to 707, albeit with respect to the second circuit and the second processor core.

At 709, a first reliability level is associated with the first processor core based on the first new processor core speed. Similarly, a second reliability level is associated with the second processor core based on the second new processor core speed at 710. As noted with respect to FIG. 6, a processor core speed may serve as an indication of its reliability. Accordingly, the first and second processor cores may be assigned a reliability level based on their respective processor core speeds. The assigned reliability levels may be stored in association with the first and second processor cores as shown in FIG. 6.

Accordingly, at 711, the application is assigned to a processor core that meets the application's reliability requirement. For example, if the first processor core's reliability level is equal to or greater than the application reliability requirement, then the processor core assignor 406 may assign the application to the first processor core. If not, then the processor core assignor 406 may assign the application to the second processor core if the second processor core satisfies the application reliability requirement. In some embodiments, the system 400 may employ a hardware core sparing technique to determine which of processor cores 402, 404, 408, 410 may be used to execute an application associated with a reliability requirement of "ultra-reliable". According to some embodiments of 711, an operating system of the system 400 may receive a warning indicator to not assign an application to a specific processor core 402, 404, 408, 410.

Next, at 712, it is determined whether the application has terminated. Termination may comprise a stopped application execution caused by any reason. Flow cycles between 707 and 712 as long as it is determined at 712 that the application has not terminated. Accordingly, the reliability levels of the first processor core and the second processor core continue to be updated while the application is being executed. Moreover, the application may be assigned to a new processor core if it is determined at 711 that the currently-assigned processor core does not meet the associated application reliability requirement. If the application is determined to have terminated at 712, the process 700 ends at 713. Some embodiments of process 700 may improve reliability of application executions.

Various modifications and changes may be made to the foregoing embodiments without departing from the broader spirit and scope set forth in the appended claims.

What is claimed is:

1. A system comprising:

a first processor core comprising a first circuit to generate a first data, wherein the first data is associated with a generated oscillation frequency of the first circuit;

a second processor core comprising a second circuit to generate a second data, wherein the second data is associated with a generated oscillation frequency of the second circuit;

a database comprising:

a first reliability level assigned to the first processor core, the first reliability level associated with a case when a percentage difference between a stored initial oscillation frequency of the first circuit and the generated oscillation frequency of the first circuit is greater than a first reliability percentage, and a second reliability level assigned to the second processor core, the second reliability level associated with a case when a second percentage difference between a stored initial oscillation frequency of the second circuit and the generated oscillation frequency of the second circuit is greater than a second reliability percentage; and a processor core assignor to assign an application to the first processor core in a case that the first reliability level is equal to an application reliability requirement associated with the application.

2. The system of claim 1, wherein the first data indicates reliability of the first processor core and the second data indicates reliability of the second processor core.

3. The system of claim 1, wherein the first processor core and the second processor core are disposed within a same die.

4. The system of claim 1, wherein the first circuit comprises a first ring oscillator, and the second circuit comprises a second ring oscillator.

5. The system of claim 1, wherein the first processor core includes a third circuit to generate a third data and the second processor core includes a fourth circuit to generate a fourth data, and wherein the processor core assignor is to assign the application to the first processor core or to the second processor core based on the first data, the second data, the third data, the fourth data, a first initial frequency, a second initial frequency and the application reliability requirement.

6. A method comprising:

receiving a first data associated with a first processor core, wherein the first data is associated with a generated oscillation frequency of a first circuit;

receiving a second data associated with a second processor core, wherein the second data is associated with a generated oscillation frequency of a second circuit;

assigning a first reliability level to the first processor core, the first reliability level in a case when a percentage difference between a stored initial oscillation frequency of the first circuit and the generated oscillation frequency of the first circuit is greater than a first reliability percentage, and assigning a second reliability level to the second processor core, the second reliability level in a case when a second percentage difference between a stored initial oscillation frequency of the second circuit and the generated oscillation frequency of the second circuit is greater than a second reliability percentage; and assigning, via a processor core assignor, an application to the first processor core in a case that the first reliability level is equal to an application reliability requirement associated with the application.

7. The method of claim 6, wherein the first data is received in response to a request from a processor core assignor and the second data is received in response to a request from the processor core assignor.

8. The method of claim 6, wherein the first circuit comprises a first ring oscillator circuit and the second circuit comprises a second ring oscillator circuit.

9. The method of claim 6, wherein the first data is associated with an oscillation frequency of the first circuit and the second data is associated with an oscillation frequency of the second circuit.

10. The method of claim 9, further comprising:

assigning a first reliability level to the first processor core based on a first initial frequency and on the first data; and assigning a second reliability level to the second processor core based on a second initial frequency and on the second data.

11. The method of claim 10, wherein the application is assigned to the first processor core if a processor core assignor determines that the first reliability level is substantially the same as the application reliability requirement.

12. A system comprising:

a double data rate memory;

a first processor core comprising a first circuit to generate a first data, wherein the first data is associated with an oscillation frequency of the first circuit;

a second processor core comprising a second circuit to generate a second data, wherein the second data is associated with an oscillation frequency of the second circuit;

a database comprising:

a first reliability level assigned to the first processor core, the first reliability level associated with a case when a percentage difference between a stored initial oscillation frequency of the first circuit and the generated oscillation frequency of the first circuit is greater than a first reliability percentage, and a second reliability level assigned to the second processor core, the second reliability level associated with a case when a second percentage difference between a stored initial oscillation frequency of the second circuit and the generated oscillation frequency of the second circuit is greater than a second reliability percentage; and a processor core assignor to assign an application to the first processor core in a case that the first reliability level is equal to an application reliability requirement associated with the application.

13. The system of claim 12, wherein the application is assigned to the first processor core if the processor core assignor determines that the first reliability level is substantially the same as the application reliability requirement.

14. The system of claim 12, wherein the first processor core and the second processor core are disposed within a same die.

* * * * *